US010189083B2

(12) United States Patent
Bi et al.

(10) Patent No.: US 10,189,083 B2
(45) Date of Patent: Jan. 29, 2019

(54) METHOD FOR RECYCLING ELECTRODE MATERIALS OF LITHIUM ION BATTERIES

(71) Applicant: Microvast Power Systems Co., Ltd., Huzhou, Zhejiang Province (CN)

(72) Inventors: Rui Bi, Huzhou (CN); Xiaoping Zhou, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 433 days.

(21) Appl. No.: 15/054,075

(22) Filed: Feb. 25, 2016

(65) Prior Publication Data

US 2016/0251740 A1 Sep. 1, 2016

(30) Foreign Application Priority Data

Feb. 28, 2015 (CN) .......................... 2015 1 0089908

(51) Int. Cl.
*B22F 1/00* (2006.01)
*B22F 8/00* (2006.01)
(Continued)

(52) U.S. Cl.
CPC .............. *B22F 1/0003* (2013.01); *B22F 8/00* (2013.01); *B22F 9/04* (2013.01); *C22C 1/1084* (2013.01);
(Continued)

(58) Field of Classification Search
CPC .. B22F 1/0003; B22F 8/00; B22F 9/04; C22C 1/1084; H01M 10/54
See application file for complete search history.

(56) References Cited

U.S. PATENT DOCUMENTS 6,835,228 B1 * 12/2004 Lin ....................... C22B 3/0005
205/583
8,951,331 B2 * 2/2015 Takahashi ............... C22B 1/005
75/414
(Continued)

FOREIGN PATENT DOCUMENTS

CN 1585187 A 2/2005
CN 1758478 A 4/2006
(Continued)

*Primary Examiner* — Cam N. Nguyen
(74) *Attorney, Agent, or Firm* — Cheng-Ju Chiang (57) ABSTRACT

A method for recycling electrode materials of lithium ion batteries, including the following steps: (1) disassembling the waste lithium ion battery to get positive electrode and negative electrode, immersing the positive electrode and/or the negative electrode into ammonia, then washing by deionized water and drying the positive electrode and/or the negative electrode; (2) sintering the dried positive electrode and/or the negative electrode, and using mechanical method to separate electrode powder material from current collector to get positive electrode powder material and/or negative electrode powder material; (3) supplementing lithium to the positive electrode powder material, then processing the positive electrode powder material by milling, spray drying and sintering to obtain regenerated positive electrode material; or processing the negative electrode powder material by milling, spray drying and sintering to obtain regenerated negative electrode material. The method has advantages of energy saving, simple operation, short processing time and less pollution.

15 Claims, 4 Drawing Sheets

(51) Int. Cl.
*B22F 9/04* (2006.01)
*C22C 1/10* (2006.01)
*H01M 10/54* (2006.01)
*B22F 9/00* (2006.01)

(52) U.S. Cl.
CPC ....... *H01M 10/54* (2013.01); *B22F 2009/001* (2013.01); *B22F 2998/10* (2013.01); *Y02P 10/24* (2015.11); *Y02W 30/541* (2015.05); *Y02W 30/84* (2015.05)

(56) References Cited

U.S. PATENT DOCUMENTS

| | | | | |
|---|---|---|---|---|
| 9,203,126 | B2* | 12/2015 | Takahashi | C22B 7/001 |
| 9,212,406 | B2* | 12/2015 | Takahashi | C22B 1/005 |
| 9,599,677 | B2* | 3/2017 | Maeba | H01M 6/52 |
| 9,614,261 | B2* | 4/2017 | Kepler | H01M 10/54 |
| 2011/0223491 | A1* | 9/2011 | Xu | B82Y 30/00 |
| | | | | 429/338 |
| 2014/0318313 | A1* | 10/2014 | Takahashi | C22B 7/001 |
| | | | | 75/10.53 |
| 2016/0049700 | A1* | 2/2016 | Tsang | H01M 10/54 |
| | | | | 423/150.1 |
| 2016/0049701 | A1* | 2/2016 | Kepler | H01M 10/54 |
| | | | | 205/59 |

FOREIGN PATENT DOCUMENTS

| | | |
|---|---|---|
| CN | 101944644 A | 1/2011 |
| CN | 103346365 A | 10/2013 |
| CN | 103915661 A | 7/2014 |

\* cited by examiner

METHOD FOR RECYCLING ELECTRODE MATERIALS OF LITHIUM ION BATTERIES

CROSS REFERENCE TO RELATED APPLICATION

The present application is based on and claims priority of Chinese Patent Application No. 201510089908.9, filed on Feb. 28, 2015. The entire disclosure of the above-identified application, including the specification, drawings and claims are incorporated herein by reference in its entirety.

FIELD OF THE INVENTION

The present invention relates to recycling of battery materials, and more particularly to a method for recycling electrode materials of lithium ion batteries.

BACKGROUND OF THE INVENTION

Lithium ion battery was commercialized from 1990s. Lithium ion batteries are widely used in various kinds of apparatus, such as mobile communications, laptop computers, portable tools, electric bicycles, for the lithium ion batteries having advantages of higher operating voltage, higher energy density, long life cycle, safety performance and memoryless property. According to statistics, the global production of lithium ion batteries were more than 580 million in 2000, the domestic production in China were about 100 million. The global production of lithium ion batteries reached to 1.255 billion in 2003 and 2.71 billion in 2008, and the global production were over 3 billion until 2010. With the development of economy and technology as well as the development of global energy, lithium ion batteries will become the main power source for electric vehicles, which will further promote the development of lithium ion batteries.

In general, after 500-1000 times charging/discharging cycles, the active materials in lithium ion batteries will lose activity, which will cause decrease to battery capacity and the battery will have to be scrapped. The waste battery contains 5%-15% of Co, 2%-7% of Li, 0.5%-2% of Ni, and may further include elements such as Cu, Al, Fe, etc. Ni, Co, Li in waste batteries are first resource having a significant recycling value. The plastic or metal casing, the electrolyte and the electrodes in waste batteries are all valuable resources and have highly recycling values. Furthermore, if the waste batteries are not recycled and thrown away, the soil and water will be polluted due to the waste batteries containing a large amount of metal elements and electrolyte. The organic materials in the electrolyte of waste batteries will also volatilize to cause air pollution and bring serious environmental problems.

Currently, the technology of recycling and regeneration of waste lithium ion batteries has made a great progress. The recycling of waste lithium ion batteries mainly concentrates on the recovery of metals such as cobalt, nickel and lithium, and the resource utilization of waste lithium ion batteries is mainly concentrated on the recycling and reuse of positive electrode materials of the waste lithium ion batteries. The existing methods of recycling waste lithium ion batteries include sintering method, solvent extraction method, dissolution-chemical precipitation method, and biological method.

The sintering method is also known as dry method, in which high temperature is used to process the waste lithium ion battery to get rid of the plastic or metal casing thereof, then flotation process and precipitation process are used to get metal compounds from the waste lithium ion battery. The sintering method is easy to operate but requires high energy consumption, the burning of electrolyte and other ingredients in electrodes can lead to air pollution.

The solvent extraction method is to use the selectivity of organic extraction solvents over different metal ions to achieve separation of metal ions from each other. The solvent extraction method has the advantages of mild operation conditions and good separation effects, but the use of chemical reagent and extracting reagent also causes environmental pollution.

The dissolution-chemical precipitation method is to dissolve the active materials firstly and then add precipitator to precipitate precursor of electrode material, and finally sinter the precursor to get electrode material. This method is relatively simple and easy to operate, but how to select the precipitator and further the precipitation conditions is very important, and the large amount use of chemical reagent also causes secondary pollution to environment.

The biological method is to use microorganism to transfer useful constituents of the waste lithium ion battery to soluble compound which can be dissolved selectively to obtain liquor containing metal. This method has the advantages of low investment, low operation cost, less environmental pollution, etc. However, the negative side of this method is the long processing period, the microbial strain is not easy to culture, the leaching conditions are not easy to control, and the leaching solutions are difficult to be separated.

Chinese patent publication No. CN1585187A discloses a recycling method of positive electrode material in waste lithium ion battery. This method includes cutting the battery casing and taking out the positive electrode, heating the positive electrode to separate the positive material and the current collector, removing conductive agent from the positive material under high-temperature, and sintering the positive material after adding lithium to get positive electrode material. This method is only limited to recycle positive electrode material but not applicable to recycle negative electrode material, and three times heating process during the method leads to high energy consumption.

Therefore, a method, which has preferable effect, simple operation and less environmental pollution, needs to be developed for recycling waste lithium ion batteries, for alleviating the shortage of Cu, Li and Ni resources, solving the problem of environmental pollution by waste batteries, and achieving comprehensive utilization of the resources and protection of the ecological environment.

SUMMARY OF THE INVENTION

The present invention provides a method for recycling electrode materials of lithium ion batteries. The electrode materials include positive electrode material and negative electrode material.

The method for recycling electrode materials of lithium ion batteries comprises: (1) disassembling the waste lithium ion battery to get positive electrode and negative electrode, immersing the positive electrode and/or the negative electrode into ammonia, then washing by deionized water and drying the positive electrode and/or the negative electrode; (2) sintering the dried positive electrode and/or the dried negative electrode, and using mechanical method to separate electrode powder material from current collector to get positive electrode powder material and/or negative electrode powder material; (3) supplementing lithium to the positive electrode powder material, then processing the positive electrode powder material by milling (sand milling or ball milling), spray drying and sintering to obtain regenerated positive electrode material; or processing the negative electrode powder material by milling (sand milling or ball milling), spray drying and sintering to obtain regenerated negative electrode material.

According to an embodiment of the present invention, the concentration of the ammonia in the step (1) is in the range of 1%-28%, the immersion time in the step (1) is in the range of 5-300 minutes. Preferably, the concentration of the ammonia in the step (1) is in the range of 3%-15%, the immersion time in the step (1) is in the range of 20-120 minutes.

According to an embodiment of the present invention, the sintering temperature in the step (2) is in the range of 250° C.-650° C., the sintering time in the step (2) is in the range of 1-6 hour(s). Preferably the sintering temperature in the step (2) is in the range of 300° C.-500° C., the sintering time in the step (2) is in the range of 1.5-2.5 hours.

According to an embodiment of the present invention, supplementing lithium to the positive electrode powder material in the step (3) comprises: analyzing the content of elements of the positive electrode powder material firstly, and then adding lithium compound to the positive electrode powder material according to the stoichiometric ratio of the regenerated positive electrode material to be finally obtained. The lithium compound is selected at least one from the group of lithium hydroxide monohydrate, lithium hydroxide, lithium carbonate, lithium acetate and lithium oxide.

According to an embodiment of the present invention, the speed of milling (sand milling or ball milling) in the step (3) is in the range of 1000-4000 r/min, the milling time (sand milling or ball milling) in the step (3) is in the range of 2-10 hours.

According to an embodiment of the present invention, the sintering temperature of producing the regenerated positive electrode material in the step (3) is in the range of 600° C.-1200° C., the sintering time of producing the regenerated positive electrode material in the step (3) is in the range of 5-20 hours. Preferably the sintering temperature is in the range of 700° C.-900° C., the sintering time is in the range of 8-12 hours.

According to an embodiment of the present invention, the sintering temperature of producing the regenerated negative electrode material in the step (3) is in the range of 500° C.-1000° C., the sintering time of producing the regenerated negative electrode material in the step (3) is in the range of 3-15 hours. Preferably the sintering temperature is in the range of 700° C.-850° C., the sintering time is in the range of 5-8 hours.

According to an embodiment of the present invention, the regenerated positive electrode material includes ternary material. In detail, the regenerated positive electrode material is lithium nickel-cobalt-manganese oxide or lithium nickel-cobalt-aluminum oxide.

According to an embodiment of the present invention, the regenerated negative electrode material is lithium titanate.

In the present invention, the waste lithium ion battery is discharged firstly, the discharged waste lithium ion battery is disassembled to obtain electrode plate (positive electrode plate or negative electrode plate), the electrode plate is washed, dried, sintered and then separated by mechanical method (e.g., shaking) to obtain electrode powder material (positive electrode powder material or negative electrode powder material) and current collector from the electrode plate. The current collector can be recycled directly. The electrode powder material has few impurities and does not need to remove impurity. Since the electrode powder material subsequently will be further sintered during the recycling method, the adhesive agents and conductive carbon contained in the electrode powder material do not have to be removed or even measured.

In the present invention, the obtained positive electrode powder material is inactive, and the lithium supplement for the inactive positive electrode powder material is conducted according to the analysis results of an atomic absorption spectrometer. A certain amount of lithium source (e.g., lithium hydroxide monohydrate) and the positive electrode powder material are mixed, sand milled or ball milled, spray dried and sintered to finally obtain the regenerated positive electrode material.

In the present invention, the obtained negative electrode powder material is sand milled or ball milled, spray dried and sintered to finally obtain the regenerated negative electrode material. After the sintering process, the regenerated negative electrode material is removed out before the temperature drops to 100° C. and keeps it in a dry place.

In the present invention, according to the XRD analysis, the regenerated positive electrode material has an intact crystal structure. According to the electrochemical testing, the initial discharging capacity of the regenerated positive electrode material is 155.1 mAh/g, and the initial discharging efficiency is 87.3%. After 50 cycles of charging and discharging, the discharging capacity is stable at 143.0 mAh/g, the capacity loss is merely 7.8%. The regenerated positive electrode material has excellent electrochemical performance and can be used directly in lithium ion battery as active material of positive electrode.

In the present invention, according to the XRD analysis, the regenerated negative electrode material has an intact crystal structure. According to the electrochemical testing, the initial discharging capacity of the regenerated negative electrode material is 141.9 mAh/g, and the initial charging capacity is 154.8 mAh/g. After 50 cycles of charging and discharging, the discharging capacity is stable at 154.7 mAh/g, there is no obvious capacity loss and good electrochemical performance is showed.

The present invention provides a method for recycling the waste lithium ion batteries to obtain the regenerated positive electrode material and the regenerated negative electrode material, and the regenerated positive electrode material and the regenerated negative electrode material can be used directly in producing new lithium ion battery. The method is featured by short processing time, simple operation, and no need to use a large amount of chemical reagents and solvents. The method avoids the problems of complicated process, high impurity content, low metal recovery rate and high cost, thus providing an environmental friendly way of recycling nickel, cobalt, manganese, titanium and lithium with high efficiency.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiments of this present invention are described in detail in the following, but the present invention is not limited to the following embodiments.

Figure 1:
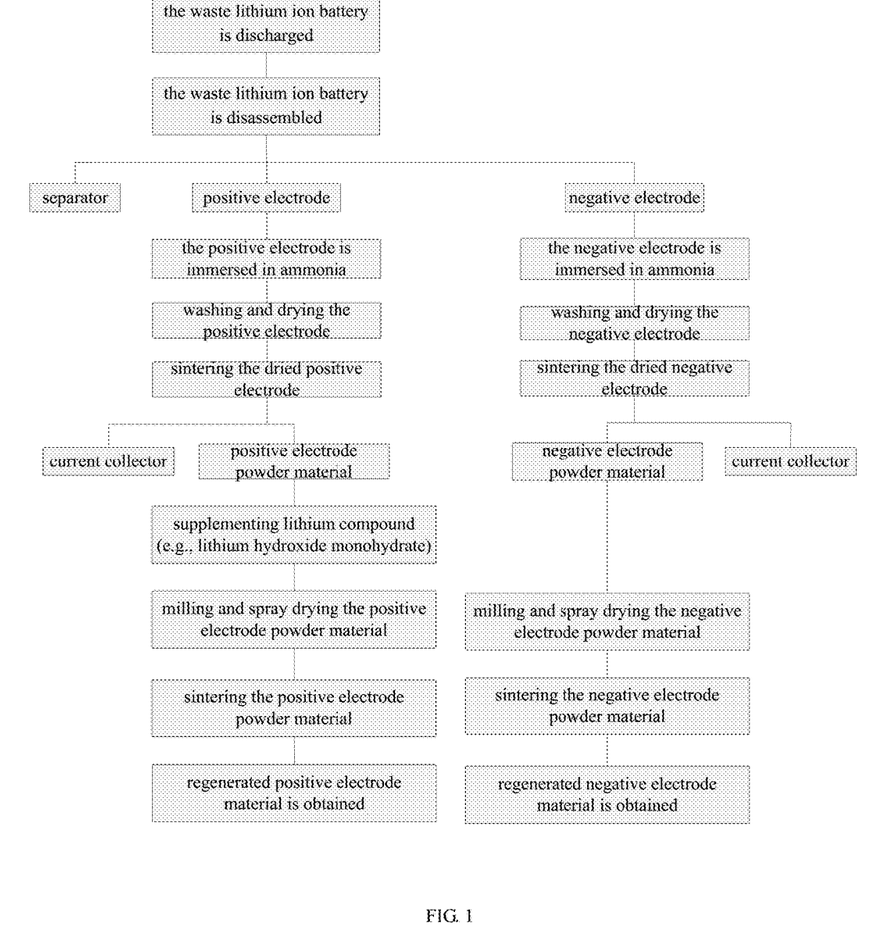
FIG. 1 shows a flowchart of the method for recycling electrode materials from waste lithium ion batteries.

The waste lithium ion batteries being recycled in the embodiments are discarded lithium titanate pouch batteries, the specific procedures of the recycling method in the embodiments are given in FIG. 1.

Embodiment 1

The waste lithium titanate pouch battery is discharged firstly and then disassembled to get positive electrode, negative electrode and separator, immersing the positive electrode and the negative electrode into ammonia with a concentration of 8% for 80 min, washing and drying the electrodes under 120° C., then putting the positive electrode and the negative electrode into muffle furnaces respectively for treatment of 4 hours under 400° C., then shaking the positive electrode and the negative electrode to separate the electrode powder material from the current collector, wherein the positive electrode is shaken to separate and obtain the positive electrode powder material, the negative electrode is shaken to separate and obtain the negative electrode powder material, finally the positive electrode powder material and the negative electrode powder material containing conductive carbon, and the current collector are obtained.

Embodiment 2

The waste lithium titanate pouch battery is discharged firstly and then disassembled to get positive electrode, negative electrode and separator, immersing the positive electrode and the negative electrode into ammonia with a concentration of 1% for 80 min, washing and drying the electrodes under 120° C., then putting the positive electrode and the negative electrode into muffle furnaces respectively for treatment of 2.5 hours under 500° C., then shaking the positive electrode and the negative electrode to separate the electrode powder material from the current collector, wherein the positive electrode is shaken to separate and obtain the positive electrode powder material, the negative electrode is shaken to separate and obtain the negative electrode powder material, finally the positive electrode powder material and the negative electrode powder material containing conductive carbon, and the current collector are obtained.

Embodiment 3

The waste lithium titanate pouch battery is discharged firstly and then disassembled to get positive electrode, negative electrode and separator, immersing the positive electrode and the negative electrode into ammonia with a concentration of 28% for 5 min, washing and drying the electrodes under 120° C., then putting the positive electrode and the negative electrode into muffle furnaces respectively for treatment of 1.5 hours under 600° C., then shaking the positive electrode and the negative electrode to separate the electrode powder material from the current collector, wherein the positive electrode is shaken to separate and obtain the positive electrode powder material, the negative electrode is shaken to separate and obtain the negative electrode powder material, finally the positive electrode powder material and the negative electrode powder material containing conductive carbon, and the current collector are obtained.

Embodiment 4

Figure 2:
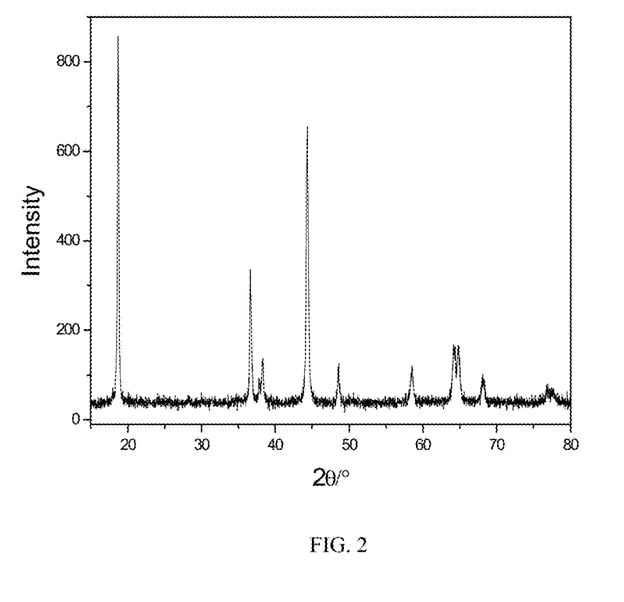
FIG. 2 shows an XRD pattern of the regenerated positive electrode material of lithium nickel-cobalt-manganese oxide in the embodiment 4.
Figure 3:
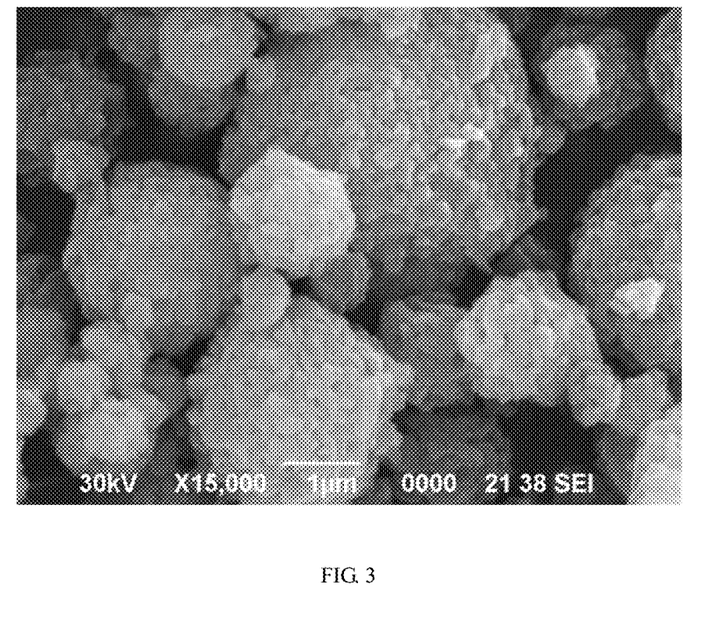
FIG. 3 shows an SEM photograph of the regenerated positive electrode material of lithium nickel-cobalt-manganese oxide in the embodiment 4.

Using atomic absorption spectrometry to analyze the positive electrode powder material as prepared in the embodiment 2, a sum of the molar content of Ni, Co and Mn (i.e., Ni+Co+Mn) is 1.4824 times to lithium, and the content of aluminum is 0.22% by ICP analysis. Mixing 1.80 g lithium hydroxide monohydrate with 20.00 g the positive electrode powder material as prepared in the embodiment 2, then sand milling at the speed of 3000 r/min for 4 hours, and thereafter spray drying it. Putting the dried positive electrode powder material into a muffle furnace for sintering, heating up to 750° C. by the speed of temperature rise at 5° C./min, keeping at 750° C. for 10 hours and then dropping down to the room temperature, finally the regenerated positive electrode material of lithium nickel-cobalt-manganese oxide is prepared. FIG. 2 and FIG. 3 show respectively the XRD pattern and the SEM photograph of the regenerated lithium nickel-cobalt-manganese oxide. As shown by FIG. 2, the regenerated positive electrode material of lithium nickel-cobalt-manganese oxide has an intact crystal structure with low impurity content.

Mixing 0.8000 g the regenerated positive electrode material with conductive carbon black and adhesive (e.g., PVDF) to get a slurry, then coating the slurry on a current collector and drying it to prepare a positive electrode; then making a coin cell using the positive electrode, lithium plate, W-scope separator (a separator made by W-scope which is a company of Korea), and MV1012D electrolyte (LiPF$_6$ in EMC/EC/DC solvent having a concentration of 1.0 mol/L, made by Microvast Power Systems Co., Ltd, the applicant of the present invention).

Figure 4:
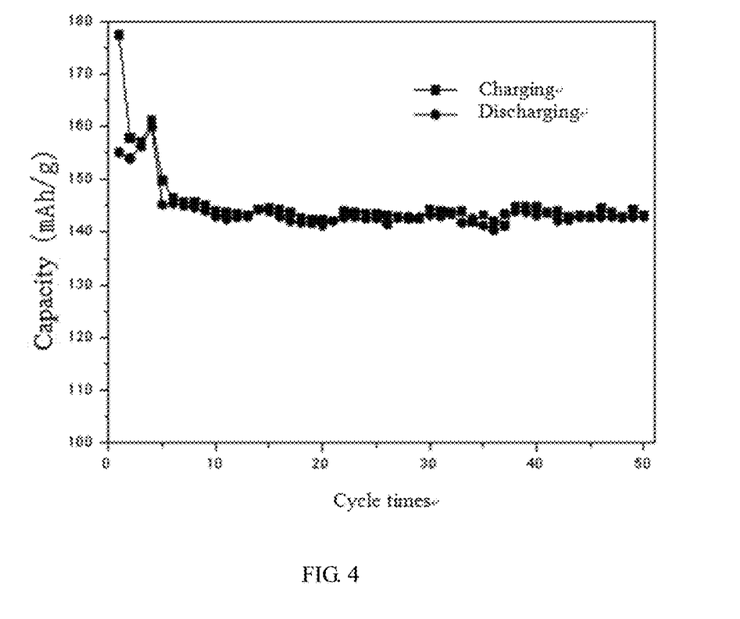
FIG. 4 shows a charging/discharging graph of the coin cell battery in the embodiment 4.

The coin cell thus made is charged and discharged between 2.5V to 4.2V under 0.05 C for the earlier 4 cycles and then charged and discharged under 0.1 C from fifth cycle. The charging/discharging graph of the coin cell is shown in FIG. 4, and the initial charging capacity is 177.5 mAh/g, and the initial discharging capacity is 155.1 mAh/g. After 50 cycles of charging and discharging, the discharging capacity is 143.0 mAh/g.

Embodiment 5

Mixing 1.00 g lithium hydroxide monohydrate with 20.00 g the positive electrode powder material as prepared in the embodiment 2, then sand milling at the speed of 2000 r/min for 5 hours, and thereafter spray drying it. Putting the dried positive electrode powder material into a muffle furnace for sintering, heating up to 650° C. by the speed of temperature rise at 5° C./min, keeping at 650° C. for 15 hours and then dropping down to the room temperature, finally the regenerated positive electrode material of lithium nickel-cobalt-manganese oxide is prepared.

Then making a coin cell using the regenerated lithium nickel-cobalt-manganese oxide according to the steps as given in the embodiment 4 and the coin cell thus made is tested, the initial charging capacity of the coin cell is 138.6 mAh/g, and the initial discharging capacity of the coin cell is 125.1 mAh/g. After 50 cycles of charging and discharging, the discharging capacity is 120.7 mAh/g.

Embodiment 6

Mixing 2.57 g lithium hydroxide monohydrate with 20.00 g the positive electrode powder material as prepared in the embodiment 2, then sand milling at the speed of 3000 r/min for 4 hours, and thereafter spray drying it. Putting the dried positive electrode powder material into a muffle furnace for sintering, heating up to 950° C. by the speed of temperature rise at 5° C./min, keeping at 950° C. for 6 hours and then dropping down to the room temperature, finally the regenerated positive electrode material of lithium nickel-cobalt-manganese oxide is prepared.

Then making a coin cell using the regenerated lithium nickel-cobalt-manganese oxide according to the steps as given in the embodiment 4 and the coin cell thus made is tested, the initial charging capacity of the coin cell is 95.1 mAh/g, and the initial discharging capacity of the coin cell is 86.0 mAh/g. After 50 cycles of charging and discharging, the discharging capacity is 63.3 mAh/g.

Embodiment 7

Figure 5:
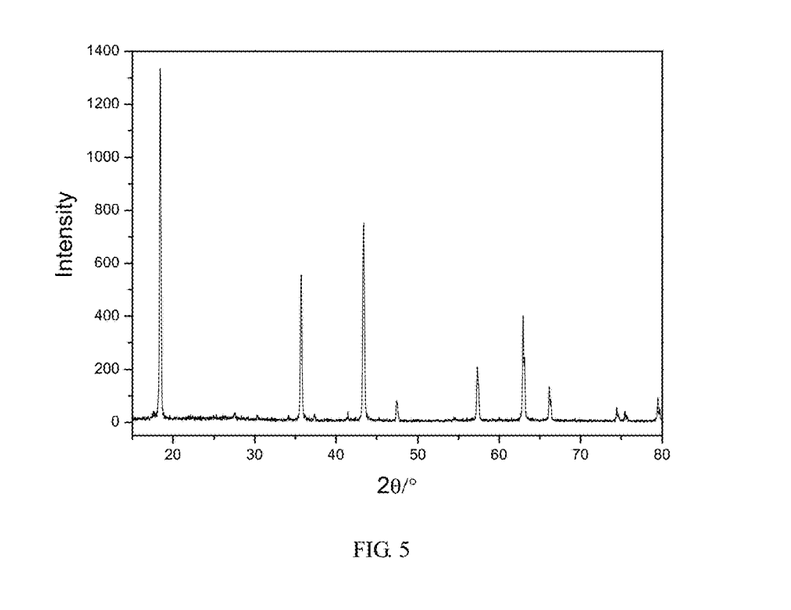
FIG. 5 shows an XRD pattern of the regenerated negative electrode material of lithium titanate in the embodiment 7.
Figure 6:
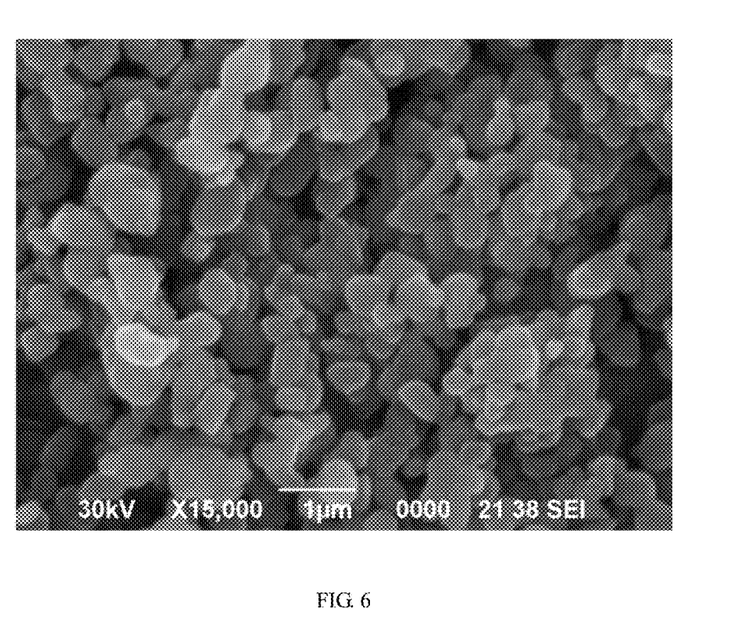
FIG. 6 shows a SEM photograph of the regenerated negative electrode material of lithium titanate in the embodiment 7.

Taking the negative electrode powder material as prepared in the embodiment 2 and sand milling it at the speed of 3000 r/min for 4 hours and then spray drying it. Putting the dried negative electrode powder material into a muffle furnace for sintering, heating up to 650° C. by the speed of temperature rise at 5° C./min, keeping at 650° C. for 10 h and then dropping down to 100° C., taking out the regenerated negative electrode material of lithium titanate and keeping it in a dry place. FIG. 5 and FIG. 6 show respectively the XRD pattern and the SEM photograph of the regenerated lithium titanate. As shown by FIG. 5, the regenerated negative electrode material of lithium titanate has an intact crystal structure.

Figure 7:
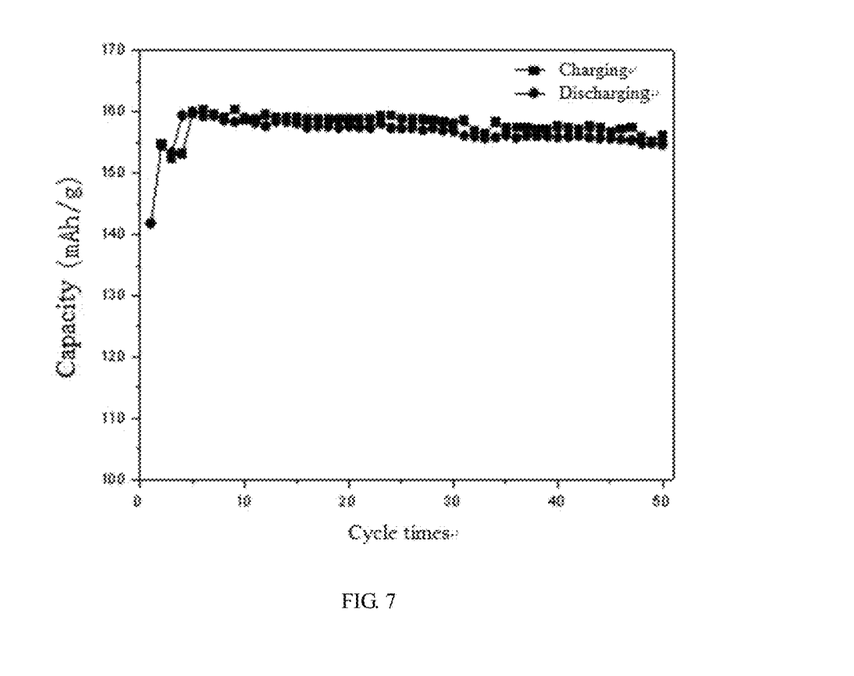
FIG. 7 shows a charging/discharging graph of the coin cell battery in the embodiment 7.

Mixing 0.8000 g the regenerated negative electrode material with conductive carbon black and adhesive (e.g., PVDF) to get a slurry, then coating the slurry on a current collector and drying it under 140° C. for 20 h to prepare an electrode; then making a coin cell using the electrode, lithium plate, W-scope separator, and MV1012D electrolyte. The coin cell thus made is charged and discharged between 1.0V to 2.5V under 0.05 C for the earlier 3 cycles and then charged and discharged under 0.1 C from fourth cycle. The charging/discharging graph of the coin cell is shown in FIG. 7, and the initial discharging capacity is 141.9 mAh/g. After 50 cycles of charging and discharging, the discharging capacity is stable at 154.7 mAh/g.

Embodiment 8

Putting the dried negative electrode powder material in the embodiment 7 into a tubular furnace for sintering, heating up to 850° C. by the speed of temperature rise at 5° C./min, keeping at 850° C. for 4 h and then dropping down to 100° C., taking out the regenerated negative electrode material of lithium titanate and keeping it in a dry place.

Then making a coin cell using the regenerated lithium titanate according to the steps as given in the embodiment 7 and the coin cell thus made is tested, the initial discharging capacity of the coin cell is 122.9 mAh/g. After 10 cycles of charging and discharging, the discharging capacity is 114.7 mAh/g.

What is claimed is:

1. A method for recycling electrode materials of lithium ion batteries, comprising:
    (1) disassembling the waste lithium ion battery to get positive electrode and negative electrode, immersing the positive electrode and/or the negative electrode into ammonia, then washing with deionized water and drying the positive electrode and/or the negative electrode;
    (2) sintering the dried positive electrode and/or the negative electrode, and using mechanical method to separate electrode powder material from current collector to get positive electrode powder material and/or negative electrode powder material; and
    (3) supplementing lithium to the positive electrode powder material, then processing the positive electrode powder material by milling, spray drying and sintering to obtain regenerated positive electrode material; or processing the negative electrode powder material by milling, spray drying and sintering to obtain regenerated negative electrode material.

2. The method for recycling electrode materials of lithium ion batteries according to claim 1, wherein a concentration of the ammonia in the step (1) is in the range of 1%-28%, an immersion time in the step (1) is in the range of 5-300 min.

3. The method for recycling electrode materials of lithium ion batteries according to claim 2, wherein the concentration of the ammonia in the step (1) is in the range of 3%-15%, the immersion time in the step (1) is in the range of 20-120 min.

4. The method for recycling electrode materials of lithium ion batteries according to claim 1, wherein a sintering temperature in the step (2) is in the range of 250° C.-650° C., a sintering time in the step (2) is in the range of 1-6 hour(s).

5. The method for recycling electrode materials of lithium ion batteries according to claim 4, wherein the sintering temperature in the step (2) is in the range of 300° C.-500° C.,the sintering time in the step (2) is in the range of 1.5-2.5 hours.

6. The method for recycling electrode materials of lithium ion batteries according to claim 1, wherein supplementing lithium to the positive electrode powder material in the step (3) comprises: analyzing the content of elements of the positive electrode powder material firstly, and then adding lithium compound to the positive electrode powder material according to the stoichiometric ratio of the regenerated positive electrode material.

7. The method for recycling electrode materials of lithium ion batteries according to claim 6, wherein the lithium compound is selected at least one from the group consisting of lithium hydroxide monohydrate, lithium hydroxide, lithium carbonate, lithium acetate and lithium oxide.

8. The method for recycling electrode materials of lithium ion batteries according to claim 1, wherein a speed of the milling in the step (3) is in the range of 1000-4000 r/min, a milling time in the step (3) is in the range of 2-10 hours.

9. The method for recycling electrode materials of lithium ion batteries according to claim 1, wherein a sintering temperature of producing the regenerated positive electrode material in the step (3) is in the range of 600° C.-1200° C., a sintering time of producing the regenerated positive electrode material in the step (3) is in the range of 5-20 hours.

10. The method for recycling electrode materials of lithium ion batteries according to claim 9, wherein the sintering temperature of producing the regenerated positive electrode material in the step (3) is in the range of 700°C.-900° C., the sintering time of producing the regenerated positive electrode material in the step (3) is in the range of 8-12 hours.

11. The method for recycling electrode materials of lithium ion batteries according to claim 1, wherein a sintering temperature of producing the regenerated negative electrode material in the step (3) is in the range of 500° C.-1000°

C., a sintering time of producing the regenerated negative electrode material in the step (3) is in the range of 3-15 hours.

12. The method for recycling electrode materials of lithium ion batteries according to claim 11, wherein the sintering temperature of producing the regenerated negative electrode material in the step (3) is in the range of 700° C.-850° C., the sintering time of producing the regenerated negative electrode material in the step (3) is in the range of 5-8 hours.

13. The method for recycling electrode materials of lithium ion batteries according to claim 1, wherein the regenerated positive electrode material includes ternary material.

14. The method for recycling electrode materials of lithium ion batteries according to claim 13, wherein the regenerated positive electrode material is lithium nickel-cobalt-manganese oxide or lithium nickel-cobalt-aluminum oxide.

15. The method for recycling electrode materials of lithium ion batteries according to claim 1, wherein the regenerated negative electrode material is lithium titanate.

\* \* \* \* \*